(12) United States Patent
Syrjanen

(10) Patent No.: US 9,996,792 B2
(45) Date of Patent: Jun. 12, 2018

(54) DATA CARRIER

(71) Applicant: GEMALTO SA, Meudon (FR)

(72) Inventor: Taru Syrjanen, Meudon (FR)

(73) Assignee: GEMALTO SA, Meudon (FR)

( * ) Notice: Subject to any disclaimer, the term of this patent is extended or adjusted under 35 U.S.C. 154(b) by 0 days. days.

(21) Appl. No.: 15/322,166

(22) PCT Filed: May 27, 2015

(86) PCT No.: PCT/EP2015/061642
§ 371 (c)(1),
(2) Date: Dec. 26, 2016

(87) PCT Pub. No.: WO2015/197282
PCT Pub. Date: Dec. 30, 2015

(65) Prior Publication Data
US 2017/0154255 A1 Jun. 1, 2017

(30) Foreign Application Priority Data
Jun. 27, 2014 (EP) .................................... 14306034

(51) Int. Cl.
G06K 19/02 (2006.01)
G06K 19/18 (2006.01)
G06K 19/16 (2006.01)

(52) U.S. Cl.
CPC ............ *G06K 19/18* (2013.01); *G06K 19/16* (2013.01)

(58) Field of Classification Search
CPC .... B42D 25/00; B42D 25/328; B42D 25/351; B42D 25/23; B42D 25/324; B42D 25/45; B42D 2033/04; B42D 2033/24
(Continued)

(56) References Cited

U.S. PATENT DOCUMENTS

2003/0234286 A1* 12/2003 Labrec ..................... B41M 3/14
235/380
2006/0151989 A1* 7/2006 Muke ....................... B41M 1/24
283/67

(Continued)

FOREIGN PATENT DOCUMENTS

EP 1935663 A1 6/2008

OTHER PUBLICATIONS

PCT/EP2015/061642, Aug. 6, 2015, International Search Report, European Patent Office, P.B. 5818 Patentlaan 2, NL—2280 V Rijswijk.

(Continued)

*Primary Examiner* — Thien M Le
(74) *Attorney, Agent, or Firm* — The Jansson Firm; Pehr B. Jansson

(57) ABSTRACT

The present invention relates to a data carrier, especially a security document, such as an identification card, comprising authentication data comprising personalized data, the data carrier comprising a first side and a second opposite side, and a plurality of layers comprising personalized data, a transparent recording layer, a transparent plastic upper layer and an opaque layer between the recording layer and the upper layer. To make the data carrier very difficult to forge and to enable that it can be manufactured with ordinary machines and without need of expensive materials, the opaque layer comprises a window a first piece of authentication data of said authentication data being divided between said plurality of layers so that the first piece of authentication data is to at least one part thereof, provided above or on the first side of the opaque layer facing the upper layer, at least a rest part of the first piece of authentication data being in the form of laser engraved markings beneath the window and provided in the recording layer, or in a (Continued)

plurality of transparent recording layers of said plurality of layers.

13 Claims, 1 Drawing Sheet

(58) Field of Classification Search
USPC .......................................................... 235/488
See application file for complete search history.

(56) References Cited

U.S. PATENT DOCUMENTS

| | | | |
|---|---|---|---|
| 2013/0147180 A1 | 6/2013 | Batistatos et al. | |
| 2014/0061447 A1* | 3/2014 | Campbell | G01S 7/4813 250/221 |
| 2014/0265295 A1* | 9/2014 | Rhyner | B42C 9/0043 281/38 |
| 2015/0168798 A1* | 6/2015 | Yamashita | G02F 1/167 359/296 |
| 2015/0283847 A1* | 10/2015 | Lim | B32B 3/266 428/138 |
| 2016/0110638 A1* | 4/2016 | Gregarek | B42D 25/41 235/488 |

OTHER PUBLICATIONS

PCT/EP2015/061642, Aug. 6, 2015, Written Opinion of the International Searching Authority, European Patent Office, P.B. 5818 Patentlaan 2, NL—2280 V Rijswijk.

* cited by examiner

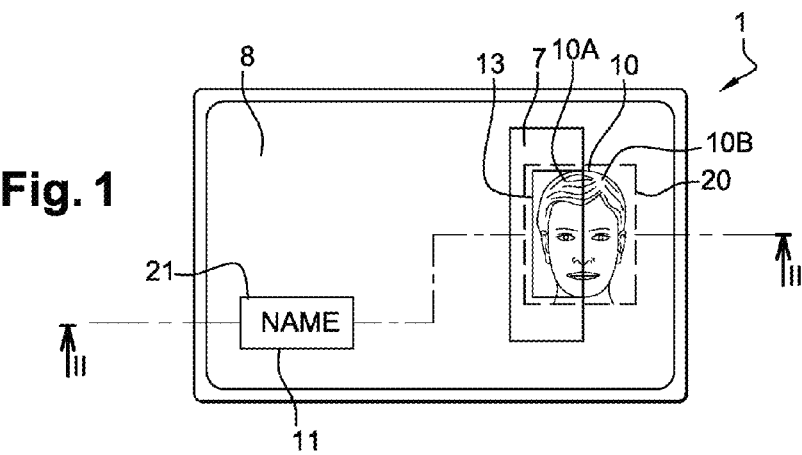
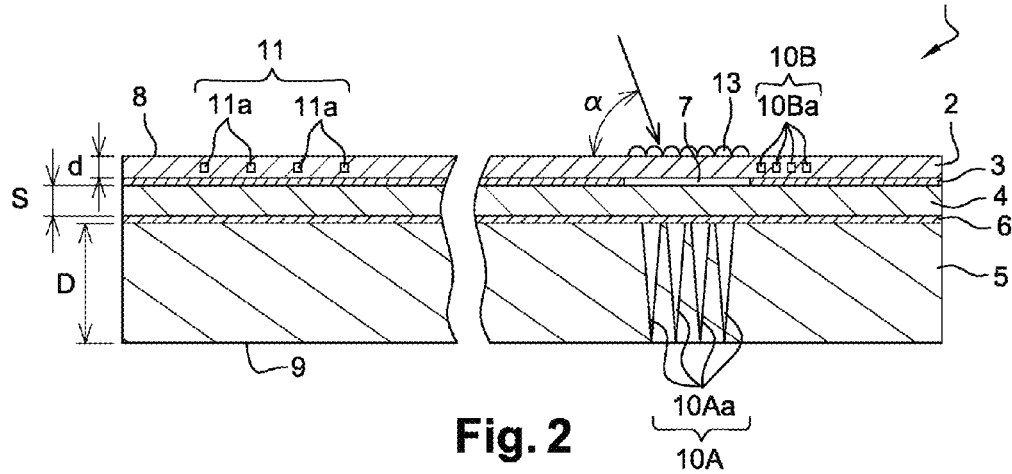
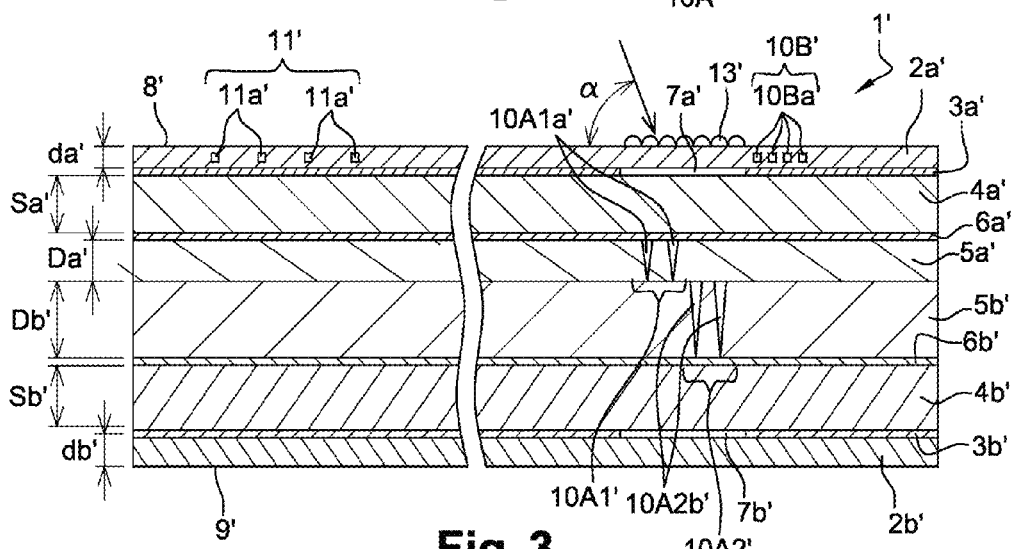

DATA CARRIER

FIELD OF THE INVENTION

The present invention relates to security features found in data carriers, such as security documents. More specifically the present invention relates to a data carrier comprising a first side and a second side opposite to the first side and a plurality of layers provided with authentication data comprising personalized data, said plurality of layers comprising a transparent recording layer, a transparent plastic upper layer, and an opaque layer between the recording layer and the upper layer. The authentication data in the recording layer has been made by laser beam. The authentication data is typically a text and/or numbers, or a photograph, visible by a naked eye. Especially, the data carrier is a security document, such as an identification card, e.g. a passport or a driving license, a credit card and a bank card.

BACKGROUND FOR THE INVENTION

Data carriers, such as identification cards and credit cards are commonly and increasingly used for various purposes. An identification card should offer great security against counterfeiting because it is used to verify aspects of a person's personal identity. Also other types of data carriers should, naturally, offer great security against counterfeiting. Despite the requirement that the data carriers should be impossible or at least very difficult to forge, they should be easy to check visually and should also be easy to mass produce. These characteristics are difficult to meet at the same time.

BRIEF DISCLOSURE OF THE INVENTION

The aim of the present invention is to provide a data carrier, especially a data card, which meets stringent requirements on security and which is suitable for mass production. The data carrier of the present invention is characterized in that the opaque layer comprises a window, a first piece of authentication data of said authentication data being divided between said plurality of layers so that the first piece of authentication data is partly, to at least one part thereof, provided above or on the first side of the opaque layer facing the upper layer, at least a rest part of the first piece of authentication data being in the form of laser engraved markings beneath the window and provided in the recording layer, or in a plurality of transparent recording layers of said plurality of layers. The expression opaque layer shall be understood broadly to mean a layer which is fully transparent or only partly transparent (i.e. semi-opaque or semi-transparent). The term window shall be understood broadly to mean any see-through area which is transparent or has a better transparency than the adjoining opaque layer.

The opaque layer can consist of printing ink but can alternatively be made up of e.g. a white (or colored) plastic. The opaque layer may in principle contain any type of printing and can typically contain the name and logo of e.g. a bank. Such a printing can alternatively be made on the lower surface of the transparent upper layer. The opaque layer can be used to give the data carrier a desired layout which identifies e.g. a bank or a company. The window is either a transparent plastic window or merely an opening.

Essential for the present invention is that a piece of authentication data, such as a picture, a name, or a date, is split into two or more parts so that one part of the piece of authentication data is positioned within, or on, one layer of the data carrier, whereas at least a rest part of the piece of authentication data is positioned in the form of laser engraved markings within one or more other transparent recording layers of the data carrier. The invention is based on these basic features which make forging of the data carrier difficult improving, hence, security of the data carrier.

Preferably the data carrier comprises an array of lenticular elements arranged at the first side of the data carrier, above the window, to provide from a predetermined angle of view an image of the rest part of said at least first piece of authentication data. The array of lenticular elements further improves the level of security of the data carrier.

Preferably, the data carrier comprises a first recording layer and a further recording layer said recording layers being non-doped transparent PVC (polyvinyl chloride) layers. Such non-doped PVC layers enable economical manufacturing of the data carrier, because non-doped PVC is a cheap material and the structure thereof can surprisingly be modified by laser engraving techniques in combination with an array of lenticular elements. In order to receive strong markings in the non-doped PVC material, the thickness of the PVC layer is preferably above 150 μm. Preferably, the data carrier comprises a second transparent plastic layer arranged between the further recording layer and the second side of the data carrier, a second opaque layer preferably being arranged between the further recording layer and the second transparent plastic layer, the second opaque layer preferably comprising a second window between the further recording layer and the second side of the data carrier, the second window being aligned with the window of the opaque layer enabling looking from the second side to the first side of the data carrier through the second window of the second opaque layer and the transparent window of the opaque layer. The second window allows identifying from the second side (back side) of the data carrier laser engraved markings within the recording layers.

Preferably there is a transparent plastic layer, preferably a PET layer, between the recording layer and the transparent plastic layer. A bi-axially oriented PET layer is advantageous because it is very strong, it is more durable in high temperatures than a PVC layer and has better bending properties thus improving the durability of the data carrier.

Preferred embodiments of the data carrier are presented in the attached dependent claims.

One major advantage of the data carrier according to the invention is that it is very difficult to forge. Transparent recording layers provided with markings are very difficult to tamper without leaving a mark. The data carrier can be manufactured with ordinary machines and without need of expensive materials.

BRIEF DESCRIPTION OF THE DRAWINGS

The invention will be described with reference to the accompanying drawing in which:

FIG. 1 illustrates a data carrier in the form or an identification card according to the invention, FIG. 2 illustrates a magnified section of a first embodiment of the invention taken along line II-II of FIG. 1, and FIG. 3 illustrates a magnified section of a second embodiment of the invention, said embodiment being a data carrier corresponding to the data carrier shown in FIG. 1 and said section taken along a line from the data carrier corresponding to line II-II of FIG. 1.

DETAILED DESCRIPTION OF THE INVENTION

FIG. 1 shows a data carrier 1 in the form of an identification card, e.g. a passport or a driving license. The identification card is a security document comprising a first side 8 and a second side (denoted with reference sign 9 in FIG. 2) opposite to the first side 8. The identification card comprises in a sub-area 20, indicated by broken line, thereof a portrait, as a first piece of authentication data 10 in the form of personalized data.

The portrait in sub-area 20 is formed of two parts: part 10B and a rest part 10A. Thus parts 10B and 10A form together a complete piece of authentication data which can be seen and identified with a naked eye. Instead of a portrait, the piece of authentication data could e.g. be any kind of a picture, e.g. a logo. Part 10B is positioned on a white area of the identification card, whereas the rest part 10A is positioned within a window 7. The formation of the white area and the formation of the window 7 will be described in connection with the description of FIGS. 2 and 3.

On top of part 10B of the first piece of authentication data 10 there is an array of lenticular elements 13 (lenticular lenses) defining a planar plane which is in parallel with a plane defined by the identification card. The array of lenticular elements 13 is a changeable laser image array (CLI technology array) or a multiple laser image array (MLI technology array). Arrays of lenticular elements are commonly known from identification documents. Owing to the characteristics of the array of lenticular elements, rest part 10A of the first piece of personalized data 10 can be clearly identified from a predetermined angle (or predetermined angles) to the plane of the array of lenticular elements 13 but cannot be identified, at least properly, from angles which deviate from said angle (or said predetermined angles), c.f. angle α in FIG. 2. Accordingly, the left half of portrait in subarea 20 can be clearly seen from a direction forming an angle α, or forming an angle close to angle α, to the plane of the identification card. Preferably angle α differs from a right angle. When angle α differs from a right angle, one cannot reproduce part 10A of the first piece of authentication data 10, and cannot consequently reproduce the whole first piece of authentication data 10, i.e. the portrait with a Xerox-copy.

Subarea 21 of the identification card comprises a further piece of authentication data 11 comprising personalized data. The further piece of authentication data 11 is e.g. a text and/or numbers, e.g. the name and/or the date of birth of the person shown in subarea 20.

FIG. 2 illustrates in a sectional view a very simple construction and embodiment of the data carrier 1 according to the invention. The sectional view is taken along line II-II in FIG. 1.

Reference sign 2 denotes a transparent plastic upper layer. The layer 2 is preferably a doped PVC (polyvinyl chloride) layer, the layer 2 being doped with carbon. As an alternative to PVC, layer 2 can e.g. be a transparent PET (polyethylene terephthalate) layer. The array of lenticular elements 13 is made into the layer 2 as an integral part of the layer in a manner known to persons skilled in the art.

As understood from FIG. 2, part 10B of the first piece of authentication data 10 is formed in layer 2. Part 10B is formed of dark spots forming markings 10Ba made with laser engraving techniques. Alternatively, part 10B of the first piece of authentication data 10 could be incorporated onto the outer surface of layer 2 by thermal transfer printing. Then layer 2 need not be a doped layer.

Layer 2 comprises also said further piece of authentication data 11. The further piece of authentication data 11 is formed of dark spots forming markings 11a made with laser engraving techniques. Alternatively, the further piece of authentication data 11 can be incorporated onto the outer surface of layer 2 by thermal transfer printing. Then layer 2 need not be a doped layer. Layer 2 can e.g. be a non-doped PVC layer or a non-doped PET layer. Other type of transparent plastic layers are further possible.

Reference sign 3 denotes an opaque layer positioned under layer 2. The opaque layer 3 is preferably manufactured by screen printing technology. The opaque layer 3 is e.g. a white (or colored) plastic layer. There can be a printing on the upper surface of the opaque layer 3. Alternatively, there can be a printing on the lower surface of layer 2. Commonly such an opaque layer 3 is called a 'white screen layer' or just 'white layer' although it can, very well, be colored. Opaque layer 3 may in principle contain any kind of picture or information (not shown in the figures) one wishes to have in the identification card. Such picture or information can be seen from the first side 8 of the data carrier 1 through the transparent layer 2. If the name of the person shown in the picture is not present in layer 2, the opaque layer 3 may contain the name of the person shown in the portrait 21. The opaque layer 3 can be used to give the card a desired layout. The opaque layer 3 can e.g. contain a company logo or bank logo if the card is a business card or a bank card, respectively.

Reference sign 7 denotes a window made into the opaque layer 3. The window 7, which is a see-through window, can be an opening or a transparent plastic window. The window 7 is positioned under the array of lenticular elements 13. The window forms a transparent area to the data carrier.

Reference sign 4 denotes a transparent PET layer. Alternatively, layer 4 could be a transparent PVC layer or some other transparent plastic layer, e.g. a HDPE layer.

Reference sign 5 denotes a recording layer comprising the rest part 10A of the first piece of authentication data 10, i.e. the rest part of the portrait in FIG. 1. The recording layer 5 is a transparent non-doped PVC layer. Although the recording layer 5 is non-doped, it was surprisingly found in tests that one could by laser engraving techniques in combination with an array of lenticular elements modify the structure of the recording layer 5 so that weak laser engraved markings 10Aa along the thickness of the recording layer were created, and when viewing these weak markings 10Aa at a distinct angle α through the array of lenticular elements 13, they could be seen as black or very dark spots having a good contrast. This, however, required that the thickness of the recording layer 5 was large enough. The thickness D of the recording layer 5 should preferably be more than 100 μm, and more preferably more than 150 μm. The markings 10Aa form the rest part 10A of the portrait in FIG. 1. Thanks to the recording layer 5 being non-doped, it does not have a grayish appearance in contrast to known doped layers of PC and PVC. The markings 10Aa can be seen through the array of lenticular elements 13 and the window 7 from an angle α which corresponds to the direction of laser rays used in the engraving, as understood by persons skilled in the art.

The transparent plastic layer 2, the opaque layer 3 and the recording layer 5 are attached to each other in a manner known by persons skilled in the art. Reference sign 6 indicates an adhesive layer combining the recording layer 5 with the transparent PET layer 4.

The thickness D of the recording layer 5 is 100 to 800 μm, preferably 100 to 700 μm, and even more preferably 150 to 600 μm. A thick recording layer 5 improves safety of the data card, because one can make in a thick recording layer markings 10Aa, which go to great depth into the data card and which, hence, are difficult to forge. The thickness of the transparent layer 2 is smaller than the thickness D of the recording layer 5. The thickness d of the transparent layer 2 is 0.1 to 0.6 times the thickness D of the recording layer 5. The thickness of layers 5 and 2 together is not more than 840 μm (=D+d). The thickness range for combined layers 5 and 2 is preferably 150 to 840 μm (=D+d). The thickness S of PET layer 4 is 0.25 to 0.9 times the thickness of the recording layer 5. The thickness d of the upper layer 2 is 0.2 to 0.6 times the thickness S of the transparent plastic layer 4. The thickness of the adhesive layer 6 is negligible. The opaque layer 3 could alternatively be positioned e.g. under the recording layer 5.

FIG. 3 shows a preferred embodiment of the invention. In the figure reference signs which correspond to those in FIG. 2 have been used for corresponding parts. The embodiment of FIG. 3 differs from the embodiment shown in FIG. 2 in that the number of layers and windows of the data carrier 1' is larger making the identification card even more difficult to forge thus improving safety. The embodiment of FIG. 3 comprises two recording layers: a first recording layer 5a', and a further recording layer 5b'. These are non-doped transparent PVC layers. The rest part 10A1', 10A2' of the first piece of authentication data 10A' is divided between these recording layers 5a', 5b'. The rest part 10A1', 10A2', which is distributed within layers 5a' and 5b', is formed of markings 10A1a' and 10A2b', respectively.

Still further, the data carrier 1' comprises on the second side 9' a second transparent plastic layer 2b' as a bottom layer, and a second opaque layer 3b' and a second transparent PET layer 4b' between the second transparent plastic layer 2b' and the further recording layer 5b'. The second transparent PET layer 4b' has been attached to the further recording layer 5b' with adhesive 6b'. The second plastic layer 2b' is preferably a doped PVC layer, but can be other type of plastic material, e.g. non-doped plastic layer, as explained for upper layer 2 in FIG. 2. Between the second plastic layer 2b' and the second transparent PET layer 4b' there is a second opaque layer 3b'. The second opaque layer 3b' could alternatively be positioned e.g. between the second recording layer 5b' and the second PET layer 4b'. The plastic layer 2b' corresponds to the plastic layer 2a', and the second opaque layer 3b' and the second transparent PET layer 4b' correspond to the opaque layer 3a' and the transparent PET layer 4a', respectively. In the second opaque layer 3b' there is a second window 7b' corresponding to window 7a' of opaque layer 3a'. However, no array of lenticular elements is present on the second side 9' of the data carrier 1.

In the embodiment of FIG. 3 the layers 4a' and/or 4b' could be made of PC, PVC, or synthetic paper (e.g. polyolefin material having the trade mark TESLIN manufactured by PPG Industries).

The second window 7b' of the second opaque layer 3b' is aligned with the window 7a' of the opaque layer 3a' so that it is possible to look from the second side 9' of the data carrier 1' to the first side 8' of the data carrier 1' through the windows 7b' and 7a'. Owing to the windows 7a' and 7b' one can from the backside of the card notice the existence of identification data contained within sub area 20 without the need to turn the identification card.

The thickness Da' of the first recording layer 5a' is 100 to 600 μm, preferably 150 to 300 μm. The thickness Db' of the further recording layer 5b' is 100 to 600 μm, preferably 150 to 300 μm. The combined thickness Da'+Db' of the recording layers 5a' and 5b' is 200 to 800 μm. Preferably, the thickness Sa', Sb' of each PET layer 4a', 4b' is 0.25 to 0.8 times the combined thickness Da'+Db' of the recording layers 5a', 5b', and the thickness da' of each transparent plastic layer 2a', 2b' is 0.2 to 0.6 times the thickness of a PET layer (PET layer 4a' or PET layer 4b'). The thickness of layers 2a', 3a', 4a', 5a', 5b', 4b', 3b', 2b' is together 250 to 840 μm. The thickness of the adhesive layers 6a' and 6b' is negligible. Preferably the thickness da' corresponds to thickness db', and the thickness Sa' corresponds to thickness Sb'.

The above combination of layers and materials provides a data carrier 1' and identification card which can be manufactured easily and economically. PET is easily bonded to PVC with adhesive. No expensive doped PC (polycarbonate) layer is used. The embodiment of FIG. 3 is advantageous because of its symmetrical nature having similar layers on both sides of the recording layer. Owing to the symmetrical layers, the card can be manufactured easily and without risk of the card warping as a consequence of manufacturing. Additionally, a symmetric identification card is durable.

The manufacturing methods of the identification card and especially the detailed steps of the manufacturing methods of the identification card are not explained here, because they are well known to a person skilled in the art.

The basic manufacturing methods include a lamination process, or alternatively, hot stamping the lens profile with a die casting tool having the lens profile of the lenticular elements prepared to its surface. Several companies provide lamination plates with the CLI feature.

The invention has been disclosed above with reference to only two embodiments of the invention. It should be noted that the invention can be realized in many different manners within the scope of the claims. For example the number of layers and subareas in the data carrier and the number of authentication data contained therein may vary. E.g. the number of recording layers can be more than two so that the rest part of the first piece of authentication data is distributed within more than two recording layers at different depts. of the data carrier. Also the plastic material chosen for different layers can vary, e.g. the recording layer(s) need not necessarily be non-doped PVC although highly recommended; it/they could be doped PC; and the upper plastic layer (2, 2a') need not be PVC or PET. The first piece of personalized data in the sub-area 20 can be some other data than a portrait. Thus, the contents of the personalized data in on or more of the sub-areas of the data carrier can vary. Although the data carrier (1, 1') has in the above been described as an identification card, it could alternatively be e.g. a credit card or a bank card.

The invention claimed is:

1. A data carrier_comprising:
 a first side and a second side opposite to the first side and a plurality of layers provided with authentication data including personalized data, said plurality of layers including:
  a transparent recording layer,
  a transparent plastic upper layer,
  a transparent PET layer between the recording layer and the upper layer, and
  an opaque layer between the recording layer and the upper layer, wherein the opaque layer including a window, a first piece of authentication data of said authentication data being divided between said plurality of layers so that the first piece of authentication data is partly, to at least one part thereof, provided above or on the first side of the opaque layer facing the upper layer, at least a rest part of the first piece of authentication data being in the form of laser engraved markings beneath the window and provided in the recording layer (5) or in a plurality of transparent recording layers of said plurality of layers, wherein the thickness (d) of the upper layer is smaller than the thickness (D) of the recording layer, and the thickness (S) of the PET layer is smaller than the thickness of the recording layer.

2. The data carrier according to claim 1, further comprising an array of lenticular elements being arranged at the first side of the data carrier, above the window, to provide from a predetermined angle of view ($\alpha$) an image of the rest part of said at least first piece of authentication data.

3. The data carrier according to claim 2 wherein the data carrier is a security document in the form of a card and in that the first piece of authentication data is visible by a naked eye and in that said rest part of said first piece of authentication data is formed of a plurality of laser markings.

4. The data carrier according to claim 1, wherein the recording layer is a doped transparent PC layer.

5. The data carrier according to claim 1, wherein the recording layer is a non-doped transparent PVC layer.

6. The data carrier according to claim 5, wherein the thickness of the recording layer is 100 to 800μm.

7. The data carrier according to claim 1, wherein the thickness (D) of the recording layer is 150 to 600μm, the thickness (S) of the PET layer is 0.25 to 0.9 times the thickness (D) of the recording layer, and the thickness (d) of the upper layer is 0.2 to 0.6 times the thickness (S) of the PET layer.

8. The data carrier according to claim 1 comprising a plurality of recording layers, wherein the recording layers comprise a first recording layer and a further recording layer (5b') and in that these recording layers are non-doped transparent PVC layers.

9. The data carrier according to claim 8, wherein the thickness (Da') of the first recording layer is 100 to 600 μm and the thickness (Db') of the further recording layer is 100 to 600 μm, the combined thickness (Da'+Db') of the first recording layer and the further recording layer being 200 to 800 μm.

10. The data carrier according to claim 8, wherein a second transparent plastic layer is arranged between the further recording layer and the second side of the data carrier.

11. The data carrier according to claim 10, further comprising a second opaque layer between the further recording layer and the second transparent plastic layer.

12. The data carrier according to claim 11, wherein the second opaque layer comprises a second window between the further recording layer and the second side of the data carrier.

13. The data carrier according to claim 12, wherein the second window of the second opaque layer is aligned with the window of the opaque layer enabling looking from the second side to the first side of the data carrier through the second window of the second opaque layer and the transparent window of the opaque layer.

* * * * *